United States Patent [19]

Kobayashi et al.

[11] Patent Number: 5,290,508
[45] Date of Patent: Mar. 1, 1994

[54] MANUFACTURING PROCESS FOR RING-SHAPED PARTS

[75] Inventors: Kazuya Kobayashi; Shigeyoshi Nagahara; Hikaru Hosono, all of Niigata, Japan

[73] Assignee: Mitsubishi Materials Corporation, Tokyo, Japan

[21] Appl. No.: 847,992
[22] PCT Filed: Aug. 7, 1991
[86] PCT No.: PCT/JP91/01058
§ 371 Date: Apr. 7, 1992
§ 102(e) Date: Apr. 7, 1992
[87] PCT Pub. No.: WO92/02326
PCT Pub. Date: Feb. 20, 1992

[30] Foreign Application Priority Data

Aug. 7, 1990 [JP] Japan .................... 2-209007

[51] Int. Cl.$^5$ .............................. B22F 7/00
[52] U.S. Cl. ........................ 419/54; 419/25; 419/50; 419/55
[58] Field of Search .......... 419/25, 54, 55, 50

[56] References Cited

U.S. PATENT DOCUMENTS

| 2,637,671 | 3/1948 | Pavitt | 148/12.4 |
| 2,842,471 | 7/1958 | Koehler | 148/12 |
| 4,492,671 | 1/1985 | Ruano et al. | 419/48 |
| 4,976,916 | 12/1990 | Shimomura | 419/25 |
| 5,049,183 | 9/1991 | Saka et al. | 75/244 |
| 5,067,979 | 11/1991 | Kiyota et al. | 75/243 |

FOREIGN PATENT DOCUMENTS

| 54-104406 | 8/1979 | Japan . |
| 55-38983 | 3/1980 | Japan . |
| 63-227751 | 9/1988 | Japan . |
| 1563726 | 9/1976 | United Kingdom . |

Primary Examiner—Peter A. Nelson
Attorney, Agent, or Firm—Oblon, Spivak, McClelland, Maier & Neustadt

[57] ABSTRACT

The present invention relates to a manufacturing process for ring-shaped parts having high wear resistance and mechanical strength. Raw material powder containing (weight %) C at 0.4–0.9%, Ni at 1.5–4.0%, Mo 0.2–0.6%, and a remainder consisting of Fe and unavoidable impurities, is compacted and shaped, thereafter sintered and forged; obtained sintered body is hardened by heating at a temperature within a range of 800°–950° C., thereafter high temperature tempering is carried out for 20–60 minutes at a temperature within a range of 570°–700° C.; then the surface layer of the inner periphery and/or outer periphery of said sintering body is heated; then if required, low temperature tempering (temper process) is carried out at a temperature within a range of 160°–220° C., and whereby the hardness of the surface layer, for which abrasive resistance is required, reaches a value of HRC 58–63 degree, and the hardness of the middle layer falls within a range of HRC 25–40 degree.

7 Claims, 5 Drawing Sheets

MANUFACTURING PROCESS FOR RING-SHAPED PARTS

FIELD OF THE INVENTION

The present invention relates to a manufacturing process for ring-shaped parts, which is suitable for the production of all kinds of ring-shaped machine parts which have sliding face of irregular shape at the inner or outer surface thereof, such as a sprocket, a pulley, a race of a one-way clutch, which is one component forming the auto-transmission of a car, a cam, etc.

PRIOR ART

In general, when manufacturing the aforementioned types of ring-shaped parts by powder sintering, a method wherein the raw material powder is first compacted and then sintered and is subsequently forged into a predetermined shape and sintered for a second time; the resulting sintered body then undergoes machine processing such as cutting and grinding, and is shaped into a predetermined ring shape; high frequency hardening is then carried out for the inner or outer surfaces of the ring-shaped part in order to increase the hardness of the aforementioned surface and improve the abrasion resistance, then the hardened body undergoes tempering at a relatively low temperature (at approximately 180° C. for 30 min.), a so-called "temper process".

However, although it is possible in the aforementioned manufacturing process for ring-shaped parts to obtain a predetermined hardness at the inner and outer periphery by high frequency hardening, the degree of hardness at the middle layer of the aforementioned parts in particular becomes too high; a moderate hardness (in other words, a great toughness) is difficult to obtain, and therefore there is a disadvantage in that it is difficult to manufacture machine parts with high radial crushing strength constant which have came into demand in recent years.

For this reason, one may think of a manufacturing process for increasing the hardness of the aforementioned surfaces, in which, in contrast to the aforementioned powder sintering method, a prototype is first produced by previous forging, and after various machine processes have been performed thereon and a predetermined shape of the aforementioned ring-shaped part is obtained, high frequency hardening is performed at the inner peripheral layer or outer peripheral layer which has to be hardened, as necessary.

However, in the aforementioned manufacturing process through forging, there is in particular the problem that if the inner or outer peripheral layers are of irregular shape, a great amount of labor is required in all the machine processes in order to produce the aforementioned shaped parts, causing a complication of the process and increasing the cost of manufacturing.

DISCLOSURE OF THE INVENTION

Here, the inventors decided to utilize the powder sintering techniques used in the production of general machinery parts, and carried out energetic research with the purpose of manufacturing ring-shaped mechanical parts having radial crushing strength constants not inferior to those made by forging. As a result the following manufacturing process was discovered. In the process, sintering and forging were carried out after compacting of a raw powder material which is composed of a composition containing (weight %) C at 0.4–0.9%, Ni at 1.5–4.0%, Mo at 0.2–0.6%, and a remainder consisting of Fe and unavoidable impurities. A sintered body superior with respect to its utilization as a mechanical part was obtained by using the abovementioned raw powder material. After hardening the obtained sintered body at a temperature within the range of 800°–950° C., high temperature tempering at a temperature within the range of 570°–700° C. for 20-60 minutes is carried out. Then the surface layer of the inner and/or outer periphery, which requires a high degree of hardness, of said sintered body is hardened. By this method we can obtain ring-shaped parts which have a high radial crushing strength constant for the entire body, because the middle layer has a desirable hardness in a rang of HRC 25–40, and a high hardness which is required for the inner and/or outer peripheral surface is obtained. By carrying out low temperature tempering (temper process) within the range of 160°–220° C. on the obtained product, it is possible to improve the radial crushing strength constant even further.

The present invention is based on this idea; even when the shape is complicated, manufacturing is easy, and the required hardness at the surface layer of inner and outer peripheries, which are sliding parts, can be attained, and furthermore it is an object of the present invention to offer a manufacturing process for ring-shaped parts which have a high radial crushing strength constant for the entire part body.

Hereinafter, the reasons for limiting the component composition of the Fe-sintered raw material in the present invention, in the above stated way, are explained.

(1) C

The C component is used in the Fe-sintered raw material for increasing the strength thereof; however, the material becomes a hyper-eutectoid if the amount contained exceeds 0.9 weight %, which results in a decrease in abrasion resistance and strength due to the coarseness of the hardening structure; and if, in contrast, this contained amount is less than 0.4 weight %, sufficient strength in the middle layer is not attained, the radial crushing strength constant decreases and a predetermined hardness by hardening (such as high frequency hardening) in order to attain the appropriate surface hardness cannot be obtained. Therefore, the aforementioned proportion of C is determined to lie within the range of 0.4–0.9 weight %.

(2) Ni

The Ni component, which is an alloying element of a substitutional solid solution for Fe, is added if toughness is required; however, if the contained amount exceeds 4.0 weight %, a further increase of this effect cannot be expected, and since it is an expensive alloying element, this is not economical either. On the other hand, if the contained amount is less than 1.5 weight %, a sufficient toughness can not be obtained, and as a result, there is the inconvenience of a decrease in the strength of the part. For these reasons, the aforementioned contained amount of Ni is determined to lie within the range of 1.5–4.0 weight %.

(3) Mo

The Mo component is added to increase the ability to be hardened; however, if the contained amount exceeds 0.6 weight %, exteusibility decreases and fragility against shock occurs. On the other hand, if this contained amount is below 0.2 weight %, hardenability decreases and there occurs non-uniformity in the hardness. Therefore, the aforementioned contained amount of Mo is determined to lie within the range of 0.2–0.6 weight %.

Next, after sintering and hardening, high temperature tempering is carried out for 20–60 minutes in a temperature range of 570°–700° C.; for obtaining a high mechanical strength in the whole mechanical part which constitutes a component in the product, and for attaining an HRC 24–40 of moderate hardness at the middle layer of the aforementioned part; and if the aforementioned tempering temperature exceeds 700° C., the middle layer becomes too soft and a sufficient work strength is not attained; and if on the other hand the temperature does not reach 570° C., there is the inconvenience that the hardness of aforementioned middle layer becomes too high and inferior in toughness, and thereby conversely becomes fragile.

Next, it is desirable that the hardening of the surface layer of the aforementioned sintered body is performed by high frequency hardening within a temperature range of 800°–950° C. Using high frequency hardening, it is possible to harden only the surface layers within a depth-range of 1–2 mm required for most mechanical parts, to HRC 58–63 required for the mechanical sliding portion. However, if the aforementioned temperature exceeds 950° C., it becomes impossible to obtain the desired hardness due to surface decarbonization; and if, on the other hand, the aforementioned temperature does not reach 800° C., sufficient hardening cannot be attained, which is undesirable.

Furthermore, it is desirable to carry out oil-cooling after heating during the aforementioned high frequency hardening process. If water-cooling is used with an high carbon Fe-sintered body like the one in the present invention, there is a high probability that quenching cracks will occur.

The final low temperature tempering treatment is carried out (temper processing) to further increase the radial crushing strength constant, and if the aforementioned temperature exceeds 220° C., the product softens and there is the inconvenience that the required hardness cannot be attained.

PREFERRED EMBODIMENTS FOR IMPLEMENTING THE INVENTION

Next, an explanation is given on the best form for implementing the present invention.

First, the composition containing (weight %) C at 0.4–0.9%, Ni at 1.5–4.0%, Mo at 0.2–0.6%, and a remainder of Fe and unavoidable impurities is compacted to a density of 6.5–7.1 g/cm$^3$ and more preferably to a density of 6.7–7.0 g/cm$^3$. Then, a primary sintering is carried out on this for 20–40 minutes within a temperature range of 1100°–1160° C.; re-heating is carried out subsequently within a temperature range of 900°–1100° C., and at the same time, forging is carried out under an inert or reducing atmosphere so that the density is increasing to a value over 7.7 g/cm$^3$. Next, by carrying out a second sintering for another 20–40 minutes within a temperature range of 1100°–1160° C., under an atmosphere of RX, N2, AX etc., preferably under RX, the sintered body is obtained.

Then, after the hardening of the sintered body has been carried out by heating under a carbonizing atmosphere within a temperature range of 800°–950° C. and by oil quenching, the high temperature tempering is carried out for 20–60 minutes within a temperature range of 570°–700° C. under an inert or reducing atmosphere. Thereby the hardness of the middle layer, which is more than 2,5 mm below the surface of aforementioned sintered body, comes to lie within the aforementioned HCR 25–40 range. In this way, the hardness at the middle layer does not become too high and a superior toughness is obtained. Next, hardening is carried out at the surface layer of the inner periphery and/or outer periphery which will be the sliding portions of the sintered body. It is desirable that the hardening for this surface layer is carried out by oil-quenching after heating the sintered body at a temperature within a range of 800°–950° C., by high frequency heating. By the process of hardening of this surface layer as above, the aforementioned surface layer is hardened to a depth of not more than 2.5 mm from the surface of the aforementioned sintered body, and a value within the range of HRC 58–63, which is a hardness usually required for this type of sliding parts, is obtained.

Then, by carrying out low temperature tempering (temper processing) within a temperature range of 160°–220° C. on the aforementioned sintered body, a ring-shaped part with a further increased radial crushing strength constant can be obtained.

PREFERRED EMBODIMENTS

Figure 1:
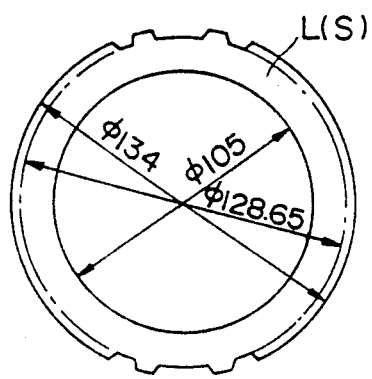
FIG. 1 is a front view showing an example of a ring-shaped part manufactured according to the present invention.
Figure 2:
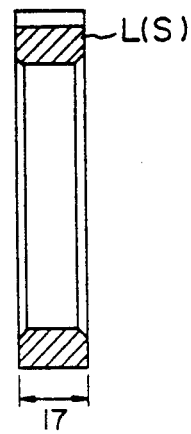
FIG. 2 is a cross section of the ring-shaped part shown in FIG. 1.

Hereinafter, the inner periphery of an outer race of a one-way clutch serves as an example for a ring-shaped part, and the first preferred embodiment of the manufacturing method for ring-shaped parts in this invention is explained with reference to FIGS. 1–6. First, raw material powder (2% Ni, 0.5% Mo, 0.7% C, remainder Fe) is compacted by using a mold to form a compacted body, a green compact. Then, after sintering this compact for 20 minutes at 1150° C., the sintered compact is forged to a predetermined shape which then undergoes a second sintering for 30 minutes at 1150° C. Then, processes such as cutting and grinding are carried out on the sintered body and a ring-shaped sintered body L of predetermined dimensions (outer diameter: 134.65 $\phi$, inner diameter: 105 $\phi$, thickness: 17 mm), as shown in FIG. 1 and FIG. 2, is produced.

Next, after having carried out hardening by heating the ring-shaped sintered body L at 850° C. and quenching it, the hardened item S is tempered for 30 minutes at a high temperature to reach a hardness within a range of HRC 28-38.

Figure 3:
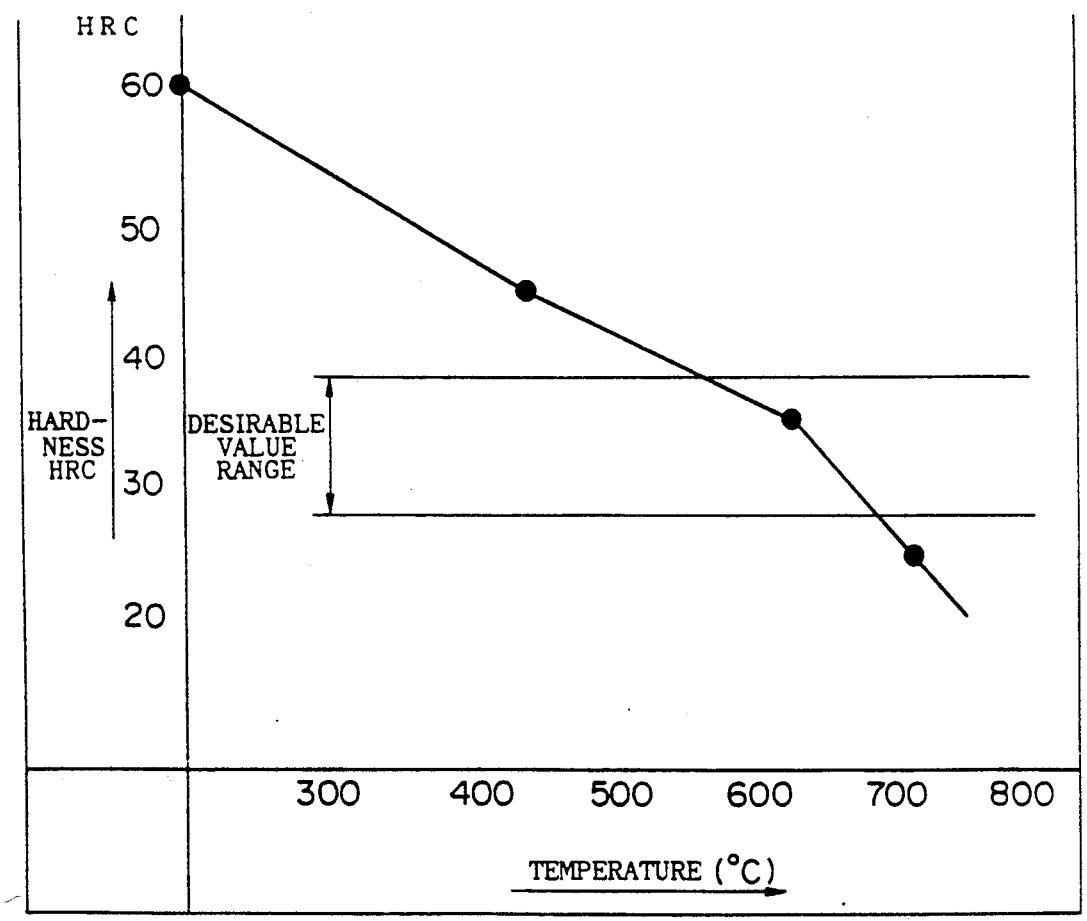
FIG. 3 is a graph showing the relation between the hardness of the sintered body and the temperature at which it was tempered.

FIG. 3 shows the relationship between hardness and tempering temperature. As indicated in this figure, the hardness can be adjusted to HRC 28-38 by setting the tempering temperature to 570°-700° C.

Figure 4:
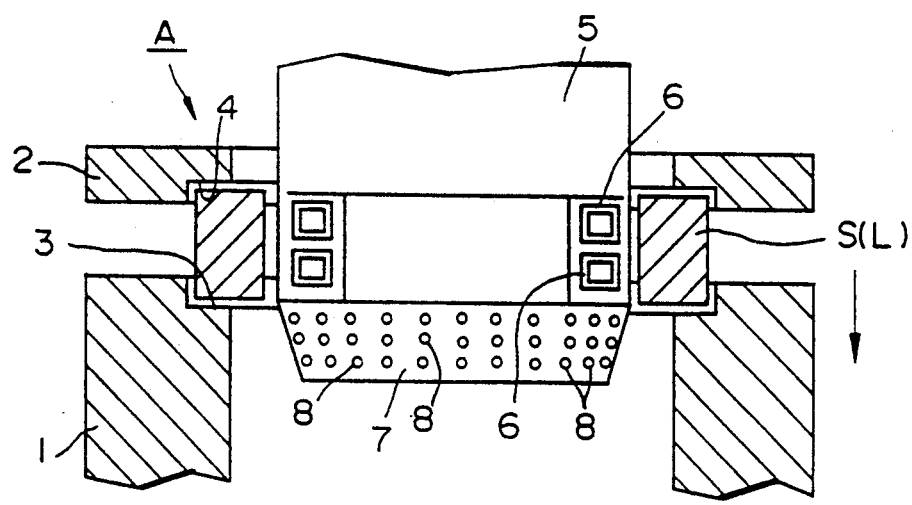
FIG. 4 is a schematic block diagram showing an example of a high frequency hardening apparatus.

Next, the surface layer of the inner periphery of the tempered hardening product S, is hardened. This hardening is carried out by high frequency hardening, whereby a high frequency hardening apparatus A, like the one shown in FIG. 4, is used.

Here, explanations are given on the hardening apparatus A, and in the same figure symbol 1 and 2 show the jigs which support hardened item S. Jig 1 is of an approximate cylindrical shape, and at the inner rim part of the top surface thereof, a counter bore part 3 is formed. On the other hand, aforementioned jig 2 has a hollow disk shape, and at the inner rim part of the lower surface thereof, a counter bore part 4 is formed. Jig 2 is provided so that it is freely separable from jig 1, and by making aforementioned jig 2 approach jig 1, the hardening item S is placed on the counter bore part 3 of jig 1 is clamped by the counter bore part 4 to be held there. Furthermore, aforementioned jigs 1 and 2 are set up to freely move up and down while holding the hardening item S and further can rotate round its axis.

At the inner periphery of aforementioned jigs 1 and 2, a heating part 5 is provided and separated from the hardening item S at a fixed distance. At the lower surface part of this heating part 5, a pair of upper and lower rectangular coils 6 is disposed so that they face towards the inner peripheral surface of hardening item S. Furthermore, these coils are separated from one another at the lower end of the heating part 5, a cooling part 7 is installed. At the outer periphery of this cooling part 7, a large number of nozzles 8 is formed for spraying the cooling water, and when the hardening item S, which is high frequency hardened by coils 6 of heating part 5, is lowered by jigs 1 and 2 and positioned at the outer periphery of the aforementioned cooling part 7, cooling water is blown from nozzles 8 against the inner peripheral surface of hardened item S.

Then, after having heated only the surface layer of the inner periphery of hardening item S to a temperature of approximately 900° C. with the high frequency hardening apparatus of the aforementioned construction, by hardening and oil-quenching the hardness of the surface layer is increased to a range within HRC 58-63 and the wear resistance of the aforementioned parts is increased.

With regard to FIG. 4, by changing the size of jigs 1 and 2, which hold hardening item S, (in this case, the high frequency conditions are constant), the depth of the hardened layer can be regulated as shown hereinafter.

| Inner diameter of the jigs | depth of the hardened layer of the surface (in mm) |
| --- | --- |
| φ 110 | 1.5-1.8 |
| φ 112 | 2.0-2.3 |
| φ 114 | 2.5-2.7 |

Besides, in this kind of high frequency hardening, cooling generally proceeds fast at both end surfaces of hardened item S which contact the atmosphere, whereas in the center part, it is difficult for the heat to dissipate, and therefore there is a tendency that the hardening depth at the aforementioned both end surfaces and the center part becomes non-uniform. Here, if the aforementioned high frequency hardening equipment is used, it is possible to attain a heat-keeping effect at the parts of the aforementioned end surfaces by jig 1 and 2, which are located at both end surfaces of the hardening item S, and therefore the range of non-uniformity in depth direction of the hardened layers can be suppressed to be less than 1 mm.

Next, the hardened item S for which high frequency hardening has been completed is tempered (temper processing) at a relatively low temperature (approximately 180° C. for 30 minutes).

Figure 5:
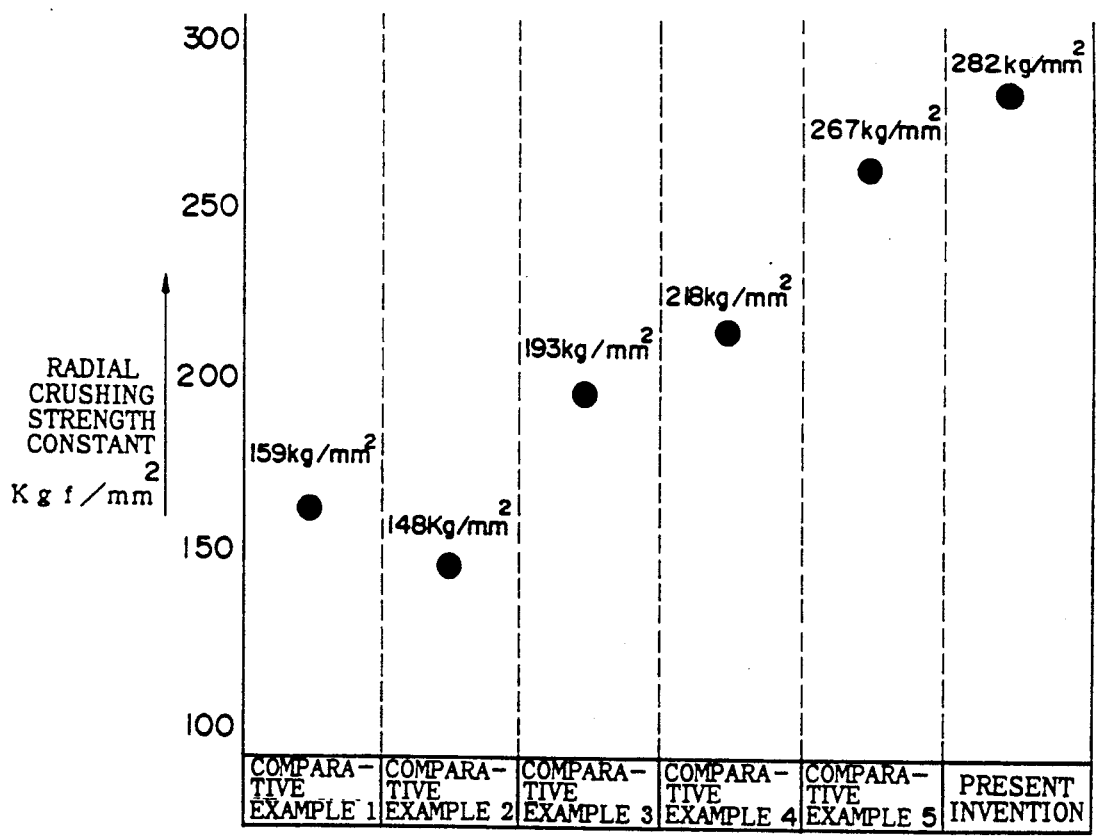
FIG. 5 is a graph showing the radial crushing strength constant of a part manufactured according to the preferred embodiment of the present invention and of parts manufactured by comparative methods.

A compression load was applied in a direction orthogonal to the axis direction of the ring-shaped part which underwent the aforementioned heating process, and the radial crushing strength constant measured was approximately 282 kg/mm$^2$, as shown in FIG. 5.

With regard to comparative examples 1-5, the ring-shaped parts underwent various heating processes described hereafter and a compression load was applied to each of them orthogonal to axis direction and the radial crushing strength constant at the time of fracture was measured. The results are shown in FIG. 5. The dimensions of the comparative ring-shaped parts were set equal to the dimensions of the ring-shaped parts in the present invention.

| | |
| --- | --- |
| Comparative example 1 | sintered body |
| Comparative example 2 | sintered body + carburizing hardening |
| Comparative example 3 | sintered body + high frequency hardening + (low temperature) tempering process |
| Comparative example 4 | sintered body + carburizing hardening + high frequency hardening + (low temperature) tempering process |
| Comparative example 5 | sintered body + carburizing hardening + (high temperature) tempering |
| Present Invention | sintered body + carburizing hardening + (high temperature) tempering + high frequency hardening + (low temperature) tempering process |

Here, the sintered body is one which follows the sintering of the compacted powder body and forging to a predetermined shape, a second sintering is performed and processes such as cutting and grinding are carried out thereon to form the aforementioned ring shape which is the shape of the product.

As shown in FIG. 5, the ring-shaped part of the present invention has superior radial crushing strength constant in comparison to the ring-shaped parts of comparative examples 1-5.

Figure 6:
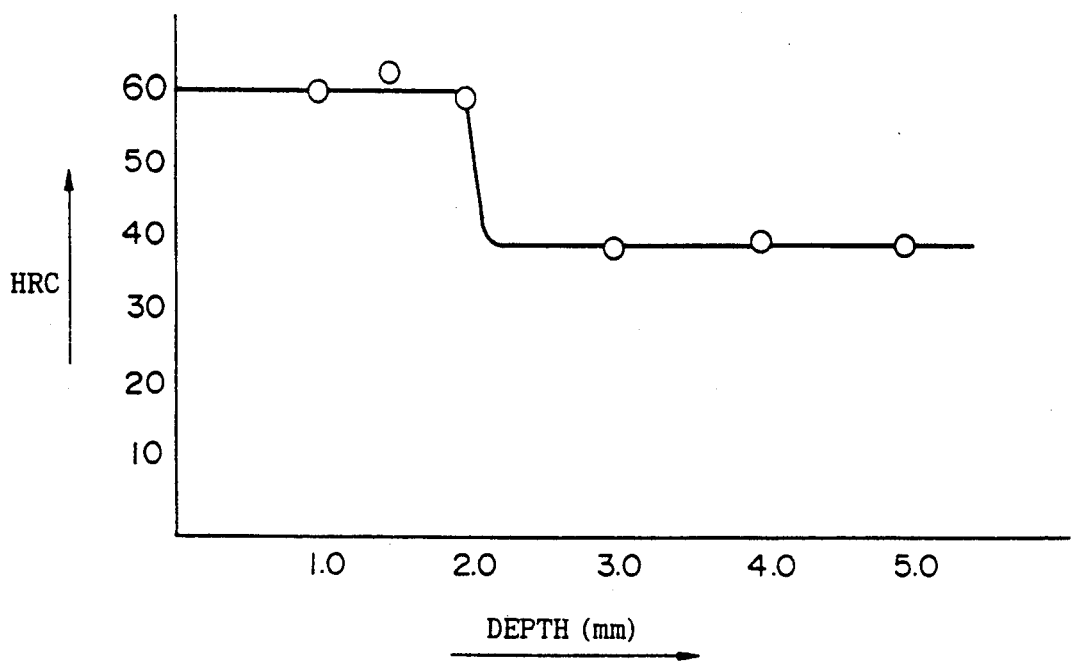
FIG. 6 is a graph showing the distribution conditions of the hardness in depth direction of the inner peripheral surface of the ring-shaped part according to the present invention.

Furthermore, the distribution conditions of the hardness in the depth direction of the ring-shaped part concerned in the present invention are shown in FIG. 6. As shown in this figure, the ring-shaped part possesses a surface layer hardness of approximately 60 HRC up to a depth of 2.0 mm from the surface and a hardness of a middle layer of approximately 38 HRC for a depth exceeding 2.0 mm. As a result of this, according to the aforementioned ring-shaped part, the sliding portions possess a high hardness and superior abrasive resistance, the middle layer has a suitable hardness and superior toughness, and thereby achieving the high mechanical strength in the whole body, in other words, a high radial crushing strength constant.

Figure 7:
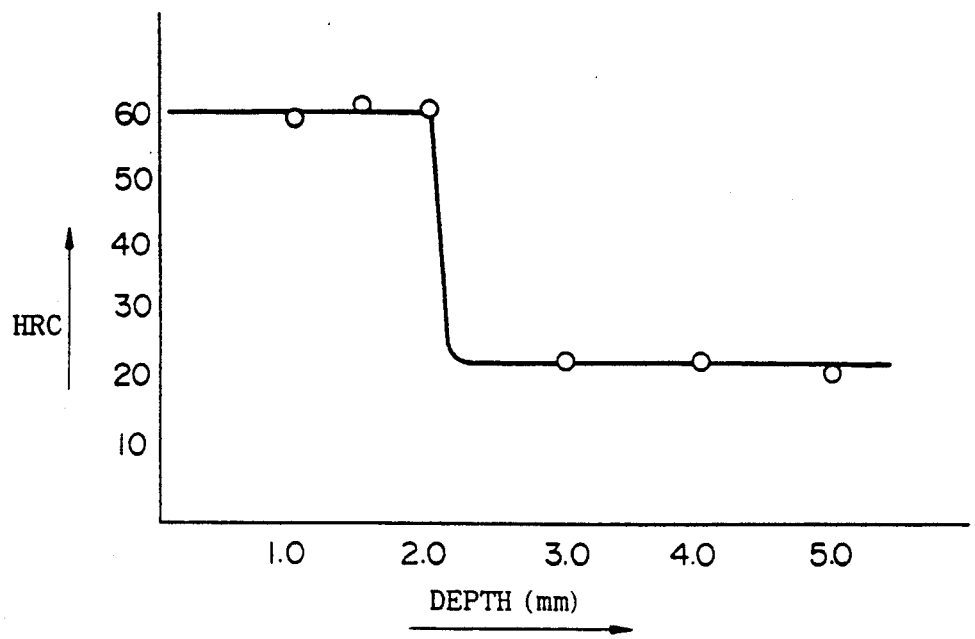
FIGS. 7 and 8 are graphs showing the hardness distribution conditions in the depth direction of the inner peripheral surface of the ring shaped part, each manufactured by conventional methods.
Figure 8:
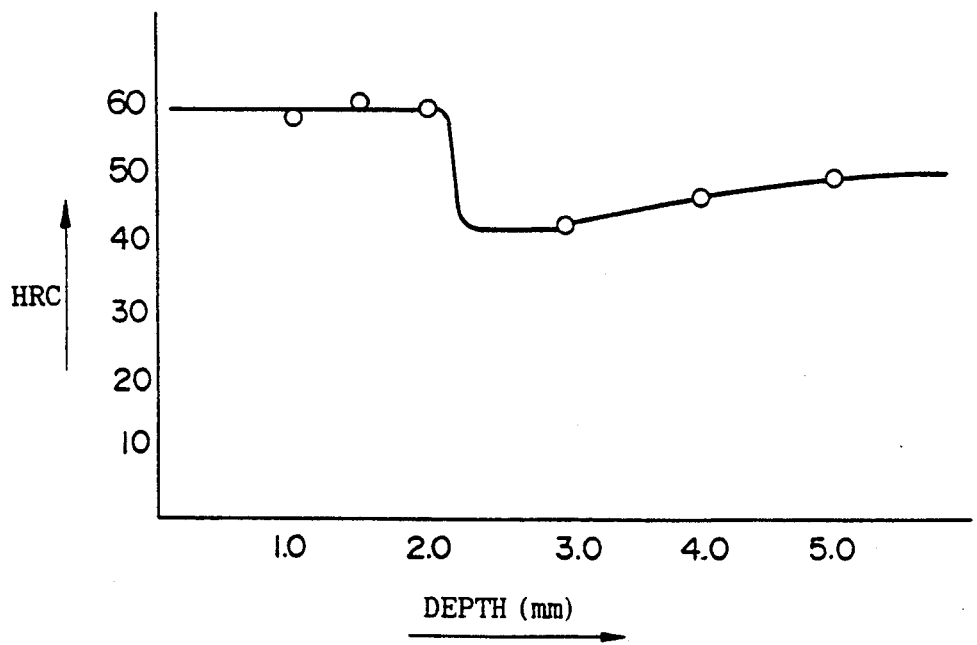

On the other hand, FIG. 7 and FIG. 8, respectively, show the distribution conditions of the hardness in the depth direction of the inner peripheral layer of the ring-shaped part in the aforementioned comparative examples 3 and 4. According to these figures, in comparative example 3, the hardness at a depth of 2.3 mm is 23 HRC and does not meet the aforementioned requirements; whereas in comparative example 4, the requirements of hardness are met, however, the hardness at a depth which exceeds the value 2.3 mm is to great at HRC 44-55 and the toughness therefore low; and as shown in FIG. 5, the radial crushing strength constant is also low.

High frequency hardening was carried out in order to increase the hardness of the surface layer of the inner periphery of the ring-shaped part in the above preferred embodiment, however, carburization or other hardening methods may be applied instead.

Possibilities for Industrial Applications

Since, in the manufacturing process of the ring-shaped part in the present invention, a high hardness required at the inner and outer peripheral surface was obtained and the toughness at the middle layer is superior, and consequently ring-shaped parts which have a high radial crushing strength constant as a whole can be easily obtained, there are many industrial applications to make suitable use of it in the manufacturing of all kinds of ring-shaped mechanical parts having complicatedly shaped sliding parts having protrusions and depressions at the outer or inner surfaces, such as gears, pulleys, races of forward one way clutches for the use in automatic transmission of automobiles, cams and sprockets, etc.

What is claimed is:

1. A manufacturing method for ring-shaped parts, characterized in that a raw material powder composition comprising C at 0.4–0.9% by weight, Ni at 1.5–4.0% by weight, Mo at 0.2–0.6% by weight, and a remainder consisting of Fe and unavoidable impurities, is compacted; thereafter sintered and forged; then, after obtained sintered body is heated at a temperature within a range of 800°–950° C., high temperature tempering is carried out for 20–60 minutes at a temperature within a range of 570°–700° C., then the surface layers of the inner periphery and/or the outer periphery of said sintered body is subjected to hardening treatment.

2. A manufacturing method for ring-shaped parts according to claim 1, characterized in that the hardening treatment of the surface layer of the sintered body is performed by heating within a range 800°–950° C., with the use of high frequency hardening, followed by oil-quenching.

3. A manufacturing method for ring shaped parts according to one of claims 1 and 2, characterized in that after compacting and shaping said raw material powder, sintering is performed for 20–40 minutes at a temperature within a range of 1100°–1160° C., then, after having carried out forging, a second sintering is carried out for 20–40 minutes at a temperature within a range of 1100°–1160° C.

4. A manufacturing method for ring-shaped parts, characterized in that a raw material powder composition comprising: C at 0.4–0.9% by weight, Ni at 1.5–4.0% by weight, Mo at 0.2–0.6% by weight and a remainder consisting of Fe and unavoidable impurities, is compacted and shaped; thereafter sintered and forged; and a sintered body obtained is hardened at a temperature within a range of 800°–950° C., and then high temperature tempering is carried out for 20–60 minutes at a temperature within a range of 570°–700° C., then the surface layer of the inner periphery and/or the outer periphery of said sintered body is processed by hardening, and then low temperature tempering (temper process) is carried out at a temperature within a range of 160°–220° C.

5. A manufacturing method for ring-shaped parts according to claim 4, characterized in that the hardening of the surface layer of the sintered body is performed by heating within a range of 800°–950° C. with the use of high frequency hardening, followed by oil-quenching.

6. A manufacturing method for ring-shaped parts according to one of claims 4 and 5, characterized in that after having compacted and shaped said raw material powder, sintering is performed for 20–40 minutes at a temperature within a range of 1100°–1160° C.; then, after having carried out forging, a second sintering is carried out for 20–40 minutes at a temperature within a range of 1100°–1160° C.

7. A manufacturing method for ring-shaped parts according to claim 6, characterized in that said forging is performed by reheating at a temperature within a range of 900°–1100° C., and under an inert or a reducing atmosphere.

* * * * *